US008667480B1

(12) United States Patent
Sigurdsson et al.

(10) Patent No.: US 8,667,480 B1
(45) Date of Patent: Mar. 4, 2014

(54) AUTOMATICALLY UPDATING BROWSER EXTENSIONS, AND APPLICATIONS THEREOF

(75) Inventors: Johann Tomas Sigurdsson, Westmount (CA); Sigurdur Asgeirsson, Beaconsfield (CA); Roger Tawa, Brossard (CA); Jeffrey Bailey, Montreal (CA); Adam Barth, Stanford, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/089,964

(22) Filed: Apr. 19, 2011

Related U.S. Application Data

(60) Provisional application No. 61/325,583, filed on Apr. 19, 2010.

(51) Int. Cl.
*G06F 9/44* (2006.01)

(52) U.S. Cl.
USPC ............................ 717/171; 717/168; 717/170

(58) Field of Classification Search
USPC ............................ 717/168–174; 709/203–204
See application file for complete search history.

(56) References Cited

U.S. PATENT DOCUMENTS

| | | | |
|---|---|---|---|
| 6,202,209 B1 * | 3/2001 | Bartholomew et al. | 717/173 |
| 6,272,674 B1 * | 8/2001 | Holiday, Jr. | 717/174 |
| 6,347,398 B1 * | 2/2002 | Parthasarathy et al. | 717/178 |
| 6,687,902 B1 * | 2/2004 | Curtis et al. | 717/175 |
| 6,714,979 B1 * | 3/2004 | Brandt et al. | 709/225 |
| 6,771,290 B1 * | 8/2004 | Hoyle | 715/745 |
| 7,222,341 B2 * | 5/2007 | Forbes et al. | 717/170 |
| 7,243,347 B2 * | 7/2007 | Palmer et al. | 717/170 |
| 7,353,509 B2 * | 4/2008 | Sheehy | 717/174 |
| 7,526,762 B1 * | 4/2009 | Astala et al. | 717/171 |
| 7,562,358 B2 * | 7/2009 | Bennett et al. | 717/170 |
| 7,665,082 B2 * | 2/2010 | Wyatt et al. | 717/171 |
| 7,784,044 B2 * | 8/2010 | Buban et al. | 717/168 |
| 7,814,143 B2 * | 10/2010 | Brown et al. | 709/203 |
| 7,861,238 B2 * | 12/2010 | Saadi et al. | 717/168 |
| 7,900,202 B2 * | 3/2011 | Block et al. | 717/175 |
| 8,171,470 B2 * | 5/2012 | Goldman et al. | 717/174 |
| 8,239,939 B2 * | 8/2012 | Dunagan et al. | 726/22 |
| 8,250,564 B2 * | 8/2012 | Bando et al. | 717/171 |
| 8,296,756 B1 * | 10/2012 | Feeser et al. | 717/173 |

OTHER PUBLICATIONS

Hanakawa et al, "A web browser for Ajax approach with asynchronous communication model", IEEE, pp. 1-7, 2006.*
Angel et al, "Qualitative Geocoding of Persistent Web Pages", ACM, pp. 1-10, 2008.*
Ye et al, "Trusted Paths for Browsers", ACM Trans. on Inf. & Sys. Security, vol. 8, No. 2, pp. 153-186, 2005.*

(Continued)

*Primary Examiner* — Anil Khatri
(74) *Attorney, Agent, or Firm* — Sterne, Kessler, Goldstein & Fox PLLC

(57) ABSTRACT

Embodiments of invention relate to automatically updating browser extensions. In an embodiment, a method for updating browser extensions is provided. In the method, an input to execute a browser extension installed in a local browser extension database is received. In response to receipt of the input, a remote server is automatically communicated with to determine whether a portion of the browser extension should be updated. An updated portion of the browser extension is received if the browser extension should be updated. Finally, the updated portion of the browser extension is installed in the local browser extension database.

23 Claims, 4 Drawing Sheets

(56) References Cited

OTHER PUBLICATIONS

Frei et al, "Public Review for Firefox (In)Security Update Dynamics Exposed", ACM SIGCOM, vol. 39, No. 1, pp. 16-22, 2009.*

Lerner et al, "Language Support for Extensible Web Browsers", ACM, pp. 39-43, 2010.*

Lowet et al, "Co-Browsing Dynamic Web Pages", ACM, pp. 941-950, 2009.*

Fourny et al, "XQuery in the Browser", ACM, pp. 1011-1020, 2009.*

Barua et al, "Protecting Web Browser Extensions from JavaScript Injection Attacks", IEEE, pp. 188-197, 2013.*

Wikipedia (the free encyclopedia), "Bing Bar," 2 pages, dated Mar. 2, 2010.

Wikipedia (the free encyclopedia), "Microsoft Silverlight," 12 pages, dated Apr. 16, 2010.

* cited by examiner

AUTOMATICALLY UPDATING BROWSER EXTENSIONS, AND APPLICATIONS THEREOF

The present application claims the benefit of U.S. Provisional Patent Application No. 61/325,583, filed on Apr. 19, 2010, entitled "Automatically Updating Browser Extensions, and Applications Thereof" by Johann Tomas Sigurdsson, Sigurdur Asgeirsson, Roger Tawa, Jeff Bailey and Adam Barth, which is incorporated herein by reference in its entirety.

BACKGROUND

1. Field of the Invention

This field is generally related to browser extensions.

2. Related Art

Additional features can be added to web browsers using browser extensions. Generally, browser extensions are treated as client-side software installed on the local browser. To install a new version of the browser extension, the browser generally has to rely on client-side periodic update software.

The periodic update software may only update the browser extension on restart of the browser or the computer system. Further, users often decline the update or disable the periodic updates software, resulting in many different browser extension versions installed in different browsers.

Systems and methods are needed to update browser extensions more easily and efficiently.

BRIEF SUMMARY

Embodiments of relate to automatically updating browser extensions. In an embodiment, a method updates browser extensions. In the method, an input to execute a browser extension installed in a local browser extension database is received, In response to receipt of the input, a remote server is automatically communicated with to determine whether a portion of the browser extension should be updated. An updated portion of the browser extension is received if the browser extension should be updated. Finally, the updated portion of the browser extension is installed in the local browser extension database.

In a second embodiment, a system updates browser extensions. The system includes a local browser extension database that stores browser extensions associated with a browser. An extension execution module receives an input to execute a browser extension installed in the local browser extension database. In response to receipt of the input, an extension update module automatically communicates with a remote server to determine whether a portion of the browser extension should be updated, receives an updated portion of the browser extension if the browser extension should be updated, and installs the updated portion of the browser extension in the local browser extension database.

In a third embodiment, a system updates browser extensions. The system includes a remote extension database that stores a plurality of browser extensions. A feature update module receives a request to update a browser extension from a client computing device. The request includes a unique browser identifier and an extension identifier. In response to the request, the feature update module uses the unique browser identifier and the extension identifier to determine whether the browser extension should be updated and which browser extension in the remote extension database to send, and sends the updated browser extension to the client computing device.

In a fourth embodiment, a method updates browser extensions. An input to execute a browser extension is received. The browser extension is installed in a local browser extension database comprising a plurality of files. In response to receipt of the input, a browser automatically communicates with a remote server to determine whether at least a portion of the browser extension should be updated. A file of the browser extension is received if the browser extension is determined to be updated. The file is installed in the local browser extension database. At least one file in the browser extension is not updated in response to the receipt of the input to execute the browser extension.

Further embodiments, features, and advantages of the invention, as well as the structure and operation of the various embodiments are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of this invention relate to automatically updating browser extensions. In an embodiment, a browser extension may be updated automatically when the browser extension is executed. In that embodiment, the updated browser extension may be downloaded and installed while the old version of the browser extension is executed. In a further embodiment, how the browser execution is updated may be customized according to the particular browser installation.

Figure 1:
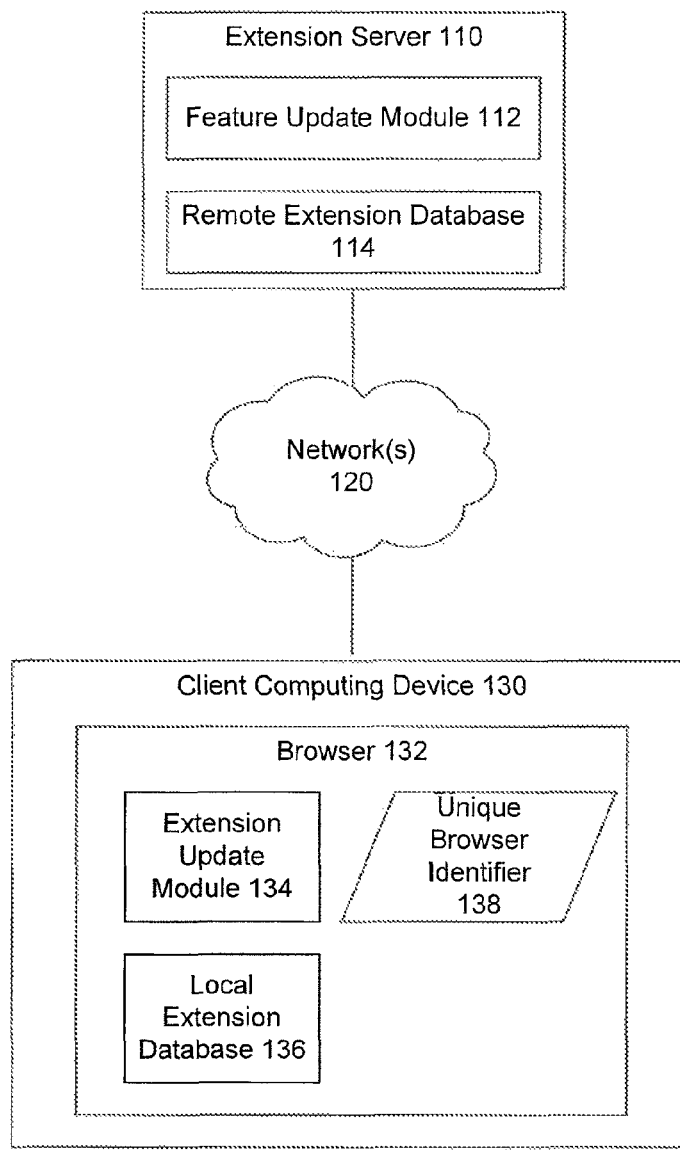
FIG. 1 shows a system for automatically updating a browser extension according to an embodiment.

FIG. 1 shows a system 100 for automatically updating a browser extension according to an embodiment. System 100 includes an extension server 110 and a client computing device 130 coupled via one or more network(s) 120, such as the Internet, or local area network. Computing device 130 includes a browser 132.

In general, system 100 operates as follows. Browser 132 receives an input to execute a browser extension. In response to the input, browser 132 automatically communicates with extension server 110 via networks 120 to determine whether the browser extension should be updated. If the browser extension should be updated, browser 132 receives an updated browser extension from extension server 110 and automatically installs the updated browser extension. In this way, system 100 updates browser extensions easily and efficiently. In an embodiment, the browser extension is not represented in native machine instructions. In an example, the browser extension may be represented in at least one of HTML, XML, JavaScript, or CSS. Each of these components and their operation is described in greater detail below.

Browser 132 includes an extension update module 134 and a local extension database 136. Browser 132 enables a user to browse web content. Browser 132 may be any type of browser including, but not limited to, a CHROME™ browser available from Google™ Inc., an INTERNET EXPLORER™ browser available from Microsoft Inc., or a SAFARI™ browser available from Apple™ Inc. When browser 132 receives an input to execute a browser extension, extension update module 134 sends a request to the extension server 110. In an embodiment, extension update module 134 may send the request in parallel with execution of browser extension. The request may include a unique browser identifier 138 to browser 132. Unique browser identifier 138 may enable extension server 110 to customize the browser extension to browser 132. The request may also identify the browser extension (or the type of browser extension) being executed using, for example, an extension identifier.

Extension server 110 is configured to receive the request sent by extension update module 134. Extension server 110 includes a feature update module 112 and a remote extension database 114. Feature update module 112 searches remote extension database 114 to determine whether it includes any updates to the browser extension being executed on browser 132. Feature update module 112 may also evaluate whether to update the browser extension for the particular browser 132 using the unique browser identifier included in the request. For example, feature update module 112 may only update the browser extension for browsers located in certain geographic regions or participating in a beta test or experimental deployment of the updated browser extension. Based on this information, feature update module 112 may determine whether to update the browser extension on browser 132. If feature update module 112 determines that it should not update the browser extension, feature update module 112 may send to client computing device 130 a response indicating that the browser extension is up-to-date. If feature update module 112 determines that it should update the browser extension, feature update module 112 may send to client computing device 130 a response with the new browser extension.

In an example experimental deployment, 0.1% of the user population may be automatically selected at random into the study sample, and another 0.1% selected the same way into a control sample. The control sample may be given the "standard" version of one of the extension (or portion thereof) while the study sample is given an experimental new version.

Upon receipt of the response at client computing device 130, extension update module 134 on client computing device 130 may update the browser extension in local extension database 136. This may involve overwriting the previous extension with the new browser extension received from extension server 110. When browser 132 receives another input to execute a browser extension, browser 132 may execute the newly updated browser extension.

In this way, the browser extension is updated, but browser 132 did not need to wait for transmission of an update by extension server 110 to execute the browser extension. Upon receipt of an input to execute the extension, browser 132 immediately executes the extension. In parallel with executing the extension, browser 132 communicates with extension server 110 to update the extension. Once the extension is updated, browser 132 executes the updated extension when it next receives an input to execute the extension. System 100 and its components are described below in greater detail with respect to FIG. 2.

Figure 2:
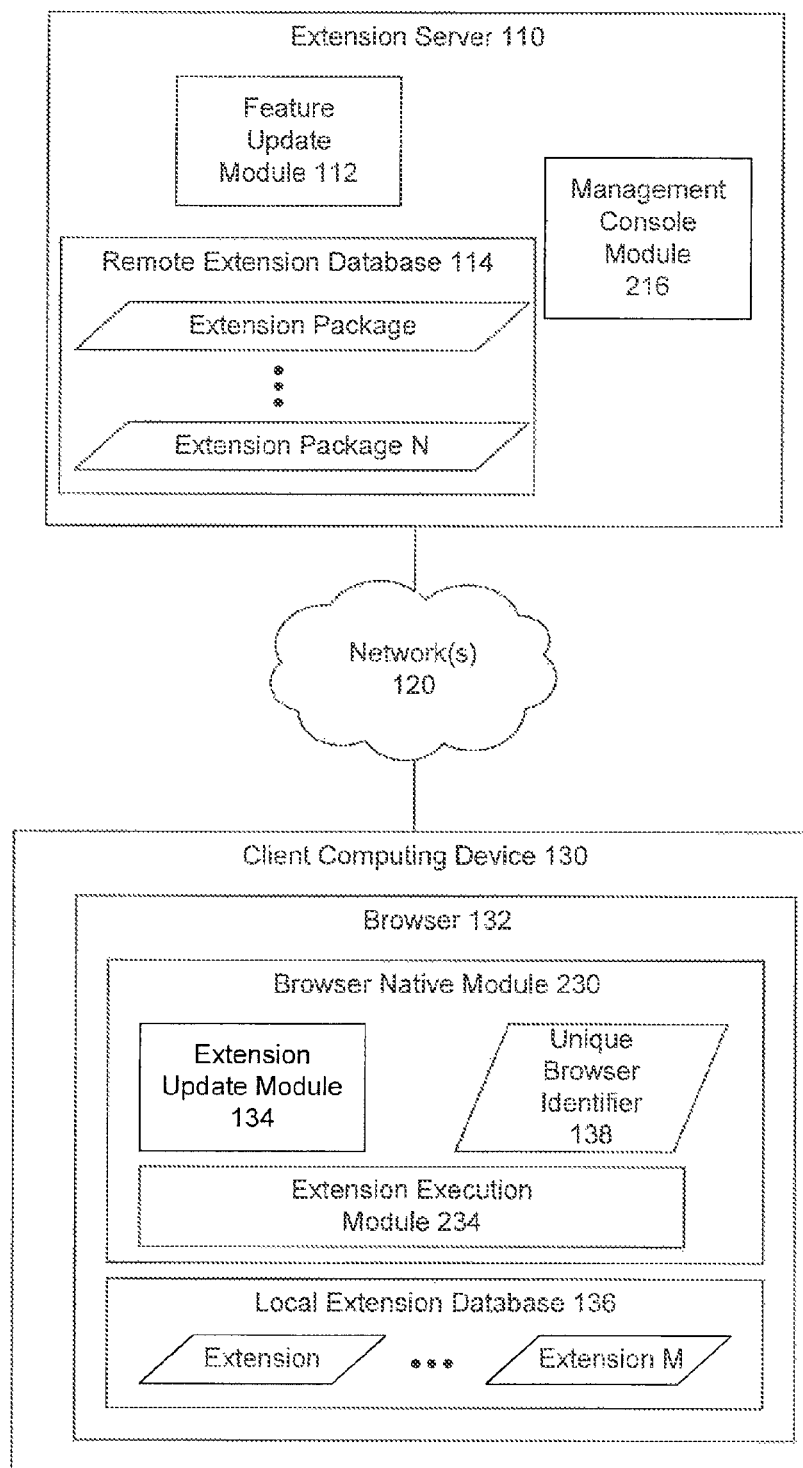
FIG. 2 shows the system in FIG. 1 for automatically updating a browser extension in greater detail.

FIG. 2 shows system 100 for automatically updating a browser extension in greater detail in an embodiment. In addition to the components in FIG. 1, FIG. 2 illustrates a management console 216 included in extension server 110 and a browser native module 230 included in browser 132. Browser native module 230 in turn includes an extension execution module 234 along with extension update module 134 and unique browser identifier 138. FIG. 2 also shows aspects of remote extension database 114 and local extension database 136 in greater detail.

Remote extension database 114 may include multiple extension packages. Each extension package may include multiple versions of a browser extension. Each extension package may be wholly independent of each other or may link to each other. In an embodiment, remote extension database may be implemented as a source code repository, such as a Concurrent Version System repository, and each extension package may be located a folder in the source code control repository. In an example, different software development teams may develop on different extension packages independently. Each extension package may include version-dependent resources and version-independent resources. The version-dependent resources may be located at a path "[module name]/[version number]/[version-specific resources]", and version-independent resources located at a path "[module-name]/common/[version-independent resources]."

Management console module 216 enables an administrator to configure how to deploy the extensions stored in remote extension database 114 to different users. More specifically, management console module 216 may enable an administrator to define whether feature update module 112 would update an extension for a particular browser 132 and which version of an extension to provide in the event that an update is requested.

An administrator may use management console module 216 to deploy different versions of extensions to different browsers. For example, management console module 216 may deploy an extension on the basis of different parameters including one or more of the following parameters:

a) the version of the minimal installed base binaries (e.g. browser native module 230) that they are running;

b) the geographical position (e.g. country) where the browser is located;

c) the language (e.g. French) in which the browser is configured to display user interface messages;

d) the distribution partner (e.g. Original Equipment Manufacturer or download distribution partner) which distributed the minimal installed base binaries (e.g. browser native module 230);

e) at least of a portion of the personalization history (e.g. a record of how the browser has been customized by the user) of the browser;

f) a user selection to, for example, "add this extension"; and g) a user's behavior patterns. In embodiments, extension server may already have stored which parameter values correspond to a particular browser and may retrieve the values using unique browser identifier 138 submitted with the update request.

In other embodiments, extension server 110 may retrieve the values of parameters (a)-(g) from other ways without employing unique browser identifier 138. In an example, when extension server 110 receives a request from browser 132 to update the extension, extension server 110 may use IP-to-country geolocation to determine the geographic location (b). In other examples, additional information may be included in the update request sent by browser 132 to provide the values of parameters (a)-(g). For example, a GPS coordinate of client computing device 130 may be included in the request to determine the geographic location (b). In another example, the distribution partner (d) is determined by a "brand code" included in the request.

In embodiments, management console module 216 enables an administrator to configure how to deploy the extensions based on the user's own actions. The user selection (f) may be determined, for example, based on for example a user's selection to a pop-up window displayed on browser 132 to "add this feature." According to the user selection, the value indicating how to update the extension may be included in the update request from client computing device 130.

In addition to an explicit user selection, management console module 216 enables an administrator to configure how to deploy the extensions based on other user actions. In one example, the user personalization history (e.g. a record of how the browser has been customized by the user) may be included in the update request. In another example, other user behavior may determine how to update the extension. For example, if a user frequently uses a web email service, an extension may be automatically deployed relating to the email service. In an embodiment to protect a user's privacy, browser 132 (or a browser extension installed thereon) may monitor the user's behavior and the request would only include a command to deploy the extension—not the behavior data used to generate the command. In that embodiment, a command based on the user's behavior (g) may appear the same to extension server 110 as a command based on the user's selection (f). In this way, it would be difficult to extrapolate a user's behavior based on the extension update requests received from client computing device 130.

Management console module 216 may enable an administrator to configure feature update module 112 to conduct an experimental rollout, such as a beta test. With an experimental rollout, a new version of an extension may be deployed to a fraction of a particular audience. For example, 1% of users could get the new version. In a first embodiment, client computing device 130 may send unique browser identifier 138 with an update request. Feature update module 122 may determine the modulus of unique browser identifier 138 and a value (e.g. 100 or 1000) indicative of the fraction of users involved in the experimental rollout. If the resulting modulus is a particular value or range of values, feature update module 122 may update at least a portion of the extension. In an embodiment, only a single file in the extension may be updated.

In a second embodiment, client computing device 130 may send a random number generated at installation of browser 132. Feature update module 122 may determine the modulus based on that random number, and accordingly deploy the extension based on that resulting modulus. In that embodiment, the random number would not uniquely identify clients or enable tracking of a client, but would still allow for experimental deployments.

In a third embodiment, management console module 216 may enable an administrator to configure feature update module 112 to conduct an experimental rollout on a nonselective fractional portion of update requests. For example, feature update module 112 may opt browsers into the experimental rollout randomly (e.g., for 1% of client requests). Extension update module 134 may recognize that an experimental rollout is being conducted and, in response, refrain from updating extensions for a specified time period (e.g., 2 weeks). In this way, the updated browser extension would not be overwritten during the specified time period of the experimental rollout.

Management console module 216 may further include oversight features. For example, one administrator may specify a policy defining how to deploy the extensions stored in remote extension database 114 to different users, and another administrator may have to approve the policy before feature update module 112 deploys extensions as defined in the policy. In another example, management console module 216 may provide a dashboard view of the different extension packages, the different extension versions and packages, or how the extension packages are deployed.

Turning to client computing device 130, browser 132 includes local extension database 136. As mentioned above, local extension database 136 stores the browser extensions stored locally on browser 132. In contrast to remote extension database 114, local extension database 136 may store only the currently installed version of each browser extension.

Client computing device 130 also includes extension execution module 234 which executes the browser extensions. In an example, the browser extensions may be in an interpretative language such as JavaScript. In that example, extension execution module 234 may interpret the browser extension, translate the interpretive code into machine code that can be executed by client computing device 130. Extension execution module 234 is described in greater detail below with respect to FIG. 4.

As mentioned above, when extension execution module 234 receives an input to execute a browser extension, extension update module 134 updates the browser extension in parallel with its execution. An extension may comprise HTML, CSS or JavaScript files. An extension may include multiple files configured to function in concert. The multiple files may be aggregated together in a ZIP file or other type of package file. The aggregate file may include a manifest file. The manifest file may include metadata about the extension (such as its name and version information). The manifest file may also include information on how to initialize the extension. Further, the manifest file may include an update URL. The update URL may, for example, specify the URL of extension server 110 used to update the extension. When extension update module 134 sends a request to update the browser extension, extension update module 134 may send the request to the URL in the manifest file and may send a request to update the entire aggregate extension file.

In another embodiment, instead of updating the entire aggregate extension file, extension update module 134 may send requests to update portions of the browser extension, such as a particular HTML within an aggregate extension file. This embodiment may enable an administrator to customize rollout of extension features even more specifically.

To update the extension, the manifest file may specify a location on extension server 110 corresponding to the extension. Analogous to mount points in Unix™, extension update module may, for example, request resources at a location within the aggregate extension file from a corresponding location on extension server 110. For example, suppose that the update URL for extension server 110 is "https://www.example.com/." In that example, when updating files from within a folder foo in an aggregate extension file, an extension update module may retrieve the files from the URL "https://www.example.com/foo. These URLs are examples and do not incorporate by reference additional subject matter.

Browser native module 230 may be implemented in native machine code (in contrast with the interpretive code of the browser extensions in local extension database 136). Such an environment may be a plug-in in a browser such as an INTERNET EXPLORER™ browser or a FIREFOX™ browser.

Some browser extensions are initially installed by a manufacturer of computing device hardware that is capable of executing a web browser application software. In one embodiment, when the browser extensions are installed, browser 132 sends a request to extension server 110 with parameters similar to those mentioned above (including the brand ID) and the extension server 110 would respond with an the browser extensions customized for that manufacturer.

However, in some instances, the browser 132 may not be able access a network connection by which to access extension server 110 when it is first installed. Further, some standards, such as an AppCache standard discussed below, may not easily allow data to be pre-loaded. At least in part to deal with these issues, in an embodiment, the manifest file may define a "first-time" or "offline" URL for updating extensions. In an example, in addition to mapping "foo/" to "https://www.example.com/foo/" the manifest file would have another URL identifying a local folder (e.g., "offlinefoo/") to be used when the extension is updated for the first-time or when browser 132 is offline. In this way, the browser extensions may be pre-loaded into local extension database 136 even when browser 132 is offline.

Each of feature update module 112, management console module 216, extension update module 134, browser 132, and extension execution module 234 may be implemented in hardware, software, firmware or any combination thereof.

Each of extension server 110 and client computing device 130 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a part of or the entirety of a clustered computing environment or server farm. This cluster or server farm may be helpful for examples in an embodiment where extension server 110 is handling a very large number of requests and communicating with a very large number of client computing devices 130.

Each of remote extension database 114 and local extension database 136 may be any type of structured memory, including a persistent memory. In examples, each database may be implemented as a relational database or file system.

Figure 3:
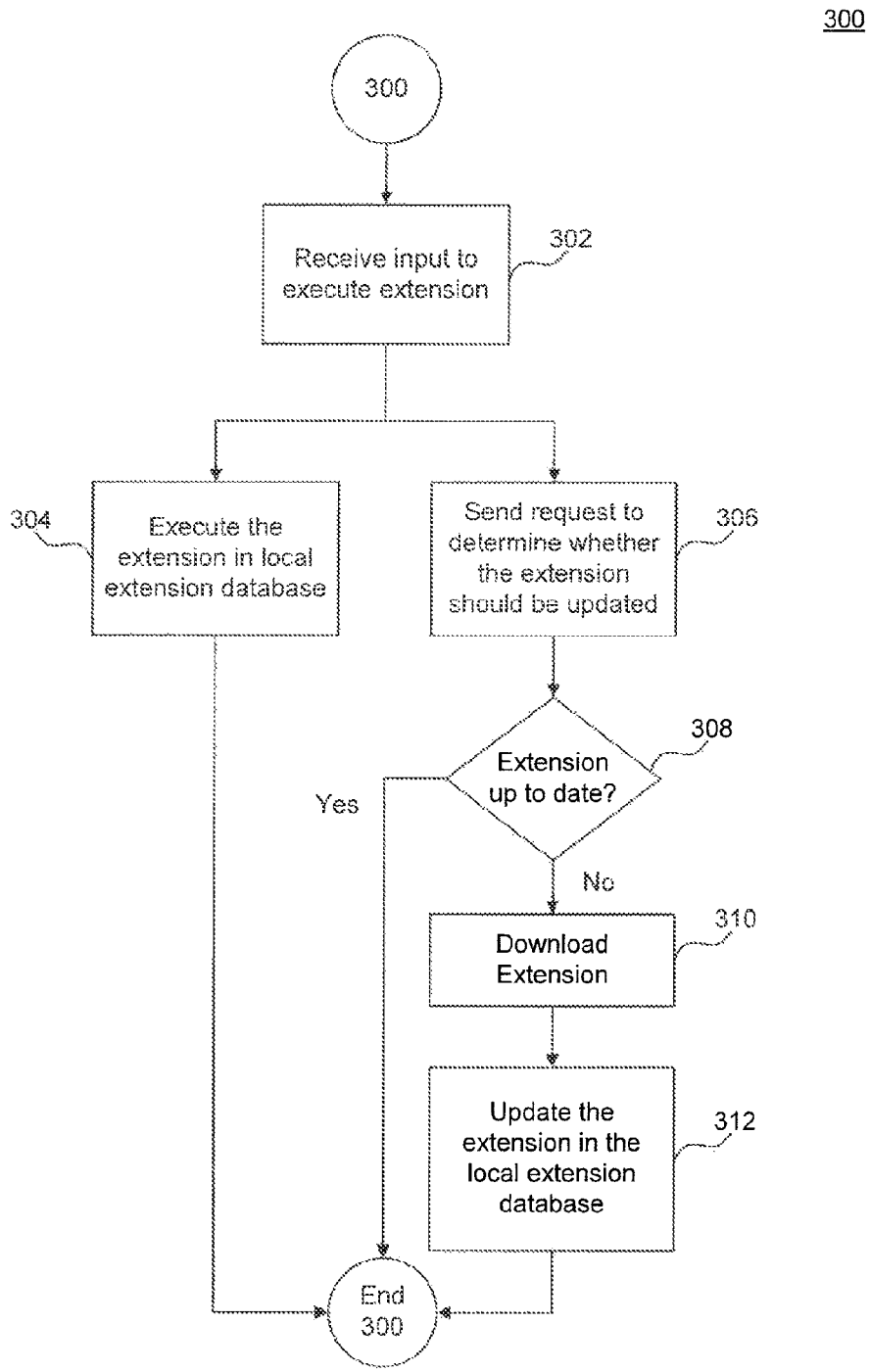
FIG. 3 shows a method for automatically updating a browser extension according to an embodiment.

FIG. 3 shows a method 300 for automatically updating a browser extension according to an embodiment. In an example, method 300 may be used in operation of system 100 illustrated in FIGS. 1-2.

Method 300 begins by receiving an input to execute a browser extension at step 302. At step 304, the extension in local extension database is executed. In parallel with step 304, a request is sent to determine whether the extension is up-to-date at step 306. If the extension is up-to-date, method 300 ends. If the extension is not up-to-date, the new extension is downloaded at step 310. At step 312, the new extension is installed in the local extension database to be use the next time the extension is extension is executed.

In this way, method 300 effectively implements an N+1 cache. Communicating with a remote server to update the extension can take time. To avoid this latency, the extension is executed from its local cache and is updated simultaneously with its execution. In this way, the extension is updated automatically, but the user does not need to wait for a browser to communicate with a remote server each and every time the extension is executed.

In one embodiment, method 300 may be implemented, at least in part, using the HTML5 AppCache standard. For example, the local extension database may be implemented according to the HTML5 AppCache standard. As would be recognized by a person of skill in the art, HTML5 AppCache allows a website to specify that certain of its resources be stored in a local cache and served from there when available. HTML5 AppCache may be configured with a policy that specifies to update the cache when a user takes an action to execute an extension. In a further embodiment, HTML5 AppCache may be configured with a policy that specifies to update the cache when a user takes an action to execute an extension only if the cache has not been updated recently (e.g., the last 8 hours).

Figure 4:
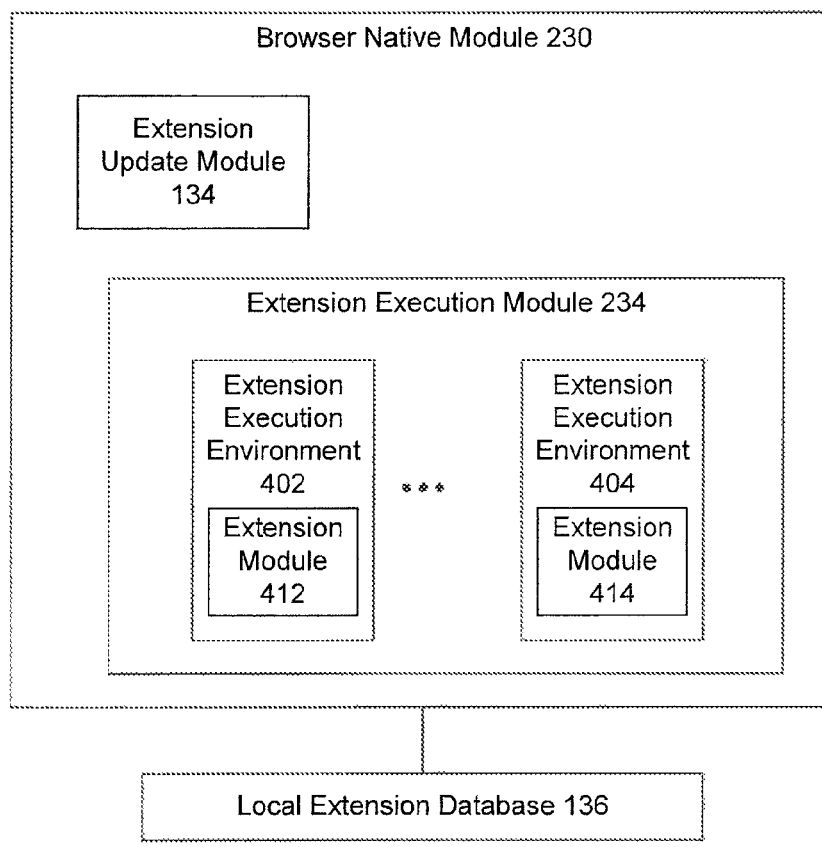
FIG. 4 shows a system for executing browser extensions according to an embodiment.

FIG. 4 shows browser 132 of system 100 in FIGS. 1-2 in greater detail. In particular, FIG. 4 shows aspects of browser 132 related to executing browser extensions in greater detail.

In FIG. 4, extension execution module 234 includes a plurality of extension execution environments 402-404. Each extension execution environments 402-404 includes a corresponding extension module such as extension module 412-414. Each extension module is an instantiation of an extension installed in local extension database 136.

When executing an extension, extension execution module 234 may instantiate extension module, the extension module may be limited in how it can access system resources by a corresponding extension execution environment. Further, the extension execution environment may provide restricted access to the JavaScript Document Object Model (DOM) of the page(s) currently loaded into browser 132. The extension execution environment may provide a sandboxed environment in which the browser extension has greater access to system resources than a JavaScript in a web page running in browser 132, but less access than browser 132 itself. In this way, extension execution environment 234 securely runs the automatically updated browser extensions.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for updating browser extensions, comprising:
    (a) in response to a user action, receiving, by a computing device, an input to execute a browser extension installed in a local browser extension database;
    (b) in response to receipt of the input, automatically sending, by the computing device, a request to a remote server, wherein, based on the request, the remote server determines which portion of the browser extension requires an update;
    (c) receiving, by the computing device, the portion of the browser extension that the remote server determined to require the update; and
    (d) installing, by the computing device, the received portion of the browser extension in the local browser extension database; and
    (e) also in response to receipt of the input (b), executing the browser extension installed in the local extension database,
    wherein the executing (e) initiates prior to completion of the installing (d),
    whereby the browser extension is executed in parallel with an update operation.

2. The method of claim 1, further comprising:
    (f) after completion of the installing (d), receiving a second input to execute the browser extension installed in the local browser extension database; and
    (e) in response to the second input, executing an updated browser extension.

3. The method of claim 1, wherein the request includes a browser identifier unique to a browser installation.

4. The method of claim 3, wherein receiving (c) comprises receiving an updated browser extension selected according to the browser identifier.

5. The method of claim 3, wherein receiving (c) comprises receiving an updated browser extension selected according to a command, wherein the command was generated according to a user's behavior patterns of the browser, but does not indicate the user's behavior patterns.

6. The method of claim 3, wherein the receiving (c) comprises receiving an updated browser extension selected according to each of:
    a) a version of the browser;
    b) a geographical position where the browser is located;
    c) a language in which the browser is configured to display user interface messages;
    d) a distribution partner which distributed at least a portion of the browser;
    e) at least a portion of the personalization history of the browser;
    f) a user selection to add the extension; and
    g) a user's behavior patterns of the browser.

7. The method of claim 3, wherein the request includes an extension identifier indicating a type of the browser extension.

8. The method of claim 3, wherein the browser extension is not represented in native machine instructions.

9. The method of claim 8, wherein the browser extension is represented in at least one of HTML, XML, JavaScript, or CSS.

10. The method of claim 1, further comprising:
    (e) in response to receipt of the input, executing the browser extension installed in the local extension database in a sandboxed environment, wherein the browser extension has greater access to system resources than a JavaScript running within a native browser associated with the local browser extension database, but less access than the native browser itself.

11. A system for updating browser extensions, comprising:
    a computing device comprising a processor and a memory;
    a local browser extension database that stores browser extensions associated with a browser;
    an extension execution module implemented on the computing device and configured to:
        in response to a user action, receive an input to execute a browser extension installed in the local browser extension database, and
        in response to receipt of the input, execute the browser extension installed in the local extension database; and
    an extension update module implemented on the computing device and configured to:
        also in response to receipt of the input, automatically send a request to a remote server, wherein, based on the request, the remote server determines which portion of the browser extension requires an update;
        receive the portion of the browser extension that the remote server determined to require the update; and
        install the received portion of the browser extension in the local browser extension database;
    wherein the extension execution module executes the browser extension prior to completion of the extension update module installing the updated browser extension,
    whereby the browser extension is executed in parallel with an update operation.

12. The system of claim 11, wherein the extension execution module is configured to receive a second input to execute the browser extension installed in the local browser extension database after completion of the extension update module installing an updated browser extension, and in response to the second input, execute the updated browser extension.

13. The system of claim 11, wherein the request includes a browser identifier unique to a browser installation.

14. The system of claim 13, wherein the extension update module is configured to receive an updated browser extension selected according to the browser identifier.

15. The system of claim 14, wherein the request includes an extension identifier indicating a type of the browser extension.

16. The system of claim 14, wherein the request includes a command, wherein the command was generated according to a user's behavior patterns of the browser, but does not indicate the user's behavior patterns.

17. The system of claim 14, wherein the extension update module is configured to receive an updated browser extension selected according to each of:
    a) a version of the browser;
    b) a geographical position where the browser is located;
    c) a language in which the browser is configured to display user interface messages;
    d) a distribution partner which distributed at least a portion of the browser;
    e) at least of a portion of the personalization history of the browser;
    f) a user selection to add the extension; and
    g) a user's behavior patterns of the browser.

18. The system of claim 14, wherein the browser extension is not represented in native machine instructions.

19. The system of claim 11, wherein the browser extension is represented in at least one of HTML, XML, JavaScript, or CSS.

20. The system of claim 11, wherein the extension execution module comprises:

an extension execution environment that allows the browser extension to have greater access to system resources than a JavaScript running within a native browser associated with the local browser extension database, but less access than the native browser itself.

21. A system for updating browser extensions, comprising:
a server computing device comprising a processor and a memory;
   a remote extension database that stores a plurality of browser extensions; and
a feature update module, implemented on the server computing device, that:
   in response to a user action, receives a request to update a browser extension from a client computing device, the request including a unique browser identifier and an extension identifier,
   in response to the request and based on the unique browser identifier and the extension identifier, determines which portion of the browser extension requires an update and which portion of the browser extension in the remote extension database to send, and
   sends the updated portion of the browser extension determined to require the update to the client computing device,
   wherein the browser extension is also executed in response to the user action,
wherein the browser extension starts execution prior to completion of an installation of the updated portion of the browser extension, and
   whereby the browser extension is executed in parallel with an update operation.

22. The system of claim 21, further comprising:
a management console module that enables a user to configure which native browsers as identified by their corresponding unique browser identifiers have extensions that will be updated on the next request.

23. A method for updating browser extensions, comprising:
(a) in response to a user action, receiving, by a computing device, an input to execute a browser extension installed in a local browser extension database comprising a plurality of files;
(b) in response to receipt of the input, automatically sending, by the computing device, a request to a remote server, wherein the remote server determines which portion of the browser extension requires an update;
(c) receiving, by the computing device, a file of the browser extension that the remote server determined to require the update in step (b);
(d) installing, on the computing device, the received file in the local browser extension database,
wherein at least another file in the browser extension is not updated in response to the receipt of the input to execute the browser extension in (a) and
(e) also in response to receipt of the input (b), executing the browser extension installed in the local browser extension database,
wherein the executing (e) initiates prior to completion of the installing (d),
whereby the browser extension is executed in parallel with an update operation.

* * * * *